United States Patent
Billstrom et al.

(10) Patent No.: US 7,360,073 B1
(45) Date of Patent: Apr. 15, 2008

(54) METHOD AND APPARATUS FOR PROVIDING A SECURE BOOT FOR A COMPUTER SYSTEM

(75) Inventors: Leif Billstrom, Alnö (SE); Kurt Lennartsson, Pleasant Hill, CA (US); Brian Wood, Clayton, CA (US)

(73) Assignees: PointSec Mobile Technologies, LLC, Redwood City, CA (US); Protect Data AB, Stockholm (SE)

( * ) Notice: Subject to any disclaimer, the term of this patent is extended or adjusted under 35 U.S.C. 154(b) by 511 days.

(21) Appl. No.: 10/440,369

(22) Filed: May 15, 2003

(51) Int. Cl.
*G06F 1/26* (2006.01)
(52) U.S. Cl. .............. 713/2; 713/1; 713/155; 713/161; 713/164; 713/168
(58) Field of Classification Search .............. 713/1, 713/2, 155, 161, 164, 168
See application file for complete search history.

(56) References Cited

U.S. PATENT DOCUMENTS

| | | | | |
|---|---|---|---|---|
| 5,828,831 | A * | 10/1998 | Kong | 726/18 |
| 6,763,458 | B1 * | 7/2004 | Watanabe et al. | 713/100 |
| 7,000,109 | B2 * | 2/2006 | Girard | 713/168 |
| 7,093,124 | B2 * | 8/2006 | Girard | 713/164 |
| 2003/0120918 | A1 * | 6/2003 | VanDer Kamp | 713/164 |
| 2004/0088697 | A1 * | 5/2004 | Schwartz et al. | 717/174 |
| 2005/0172144 | A1 * | 8/2005 | Shao | 713/200 |

* cited by examiner

*Primary Examiner*—Abdelmoniem Elamin
(74) *Attorney, Agent, or Firm*—Blakely, Sokoloff, Taylor & Zafman, LLP; Judith A. Szepesi

(57) ABSTRACT

A method and apparatus for securely booting a computer system comprises loading secure boot code and a secure operating system from the secure boot code. The method includes authenticating the user in the secure operating system, prior to permitting access to the main operating system.

22 Claims, 16 Drawing Sheets

US 7,360,073 B1

METHOD AND APPARATUS FOR PROVIDING A SECURE BOOT FOR A COMPUTER SYSTEM

FIELD OF THE INVENTION

The present invention relates to secure booting a computer system, and more specifically, to using a partition on a hard drive to create a secure booting computer system.

BACKGROUND

It is advantageous to provide boot-time user authentication on a system where all sectors on the hard drive have been encrypted. This can be used in conjunction with a "whole disk" encryption system, which prevents access to data stored on the disk without proper authorization. Since the disk itself is encrypted, the operating system (OS) cannot be booted for the authentication.

In the prior art, such pre-OS authentication has been done in as an 8-bit or 16-bit mini-OS. For example, the mini-OS that has been used in the past was DOS (disk operating system). Loading boot code is the first step in loading the mini-OS. The information stored in the boot code gives the computer instructions about starting the OS, First the Master Boot Record (MBR) and the extended partition table are read, which specifies where the boot sector is located, which is then read, starting the OS to load. This process is called loading boot code.

This environment (using 8-bit or 16-bit mini-OSes) is no longer adequate as new authentication technologies, such as biometrics and Smart Cards, are being developed that only work in newer, more advanced operating systems, such as Windows 95, Windows XP or Linux, which are generally 32-bits at this point, and will likely become 64-bit, and beyond in the future. Using such a mini-OS in conjunction with the new authentication technologies requires the construction of complicated drivers that permit the use of the technologies with the abbreviated mini-OS. This requires extensive programming, as well as introducing a delay between when a new, or updated operating system or security technology becomes available, and when the whole disk encryption method becomes available.

SUMMARY OF THE INVENTION

A method and apparatus for securely booting a computer system comprises loading secure boot code and a secure operating system addressed from the secure boot code. The method includes authenticating the user in the secure operating system, prior to permitting access to the main operating system.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for providing a secure booting for a computer system is described. To provide a foundation for new methods of authentication, the advanced OS is emulated. The present system allows the boot authentication to provide the same driver support (i.e. how to access the device and any necessary peripherals) as the OS itself, to the authentication mechanism, without compromising the underlying operating system of the system.

This type of emulation provides a number of advantages. New, advanced authentication mechanisms are easily supported with native vendor drivers, thus eliminating the requirement to create new drivers for the mechanism, eliminating the delay in the time-to-market. It also simplifies the addition of new technologies, simplifies user choices since driver availability issues are eliminated, and simplifies maintenance and support issues. Additionally, it may provide more accessibility features for disabled users, such as the availability of larger or specialized font sizes for poor vision or reading text for blind users. In one embodiment, the method of securely booting a computer system comprises loading secure boot code and a secure operating system from the secure boot code. The method includes authenticating the user in the secure operating system, prior to permitting access to the main operating system.

Figure 1:
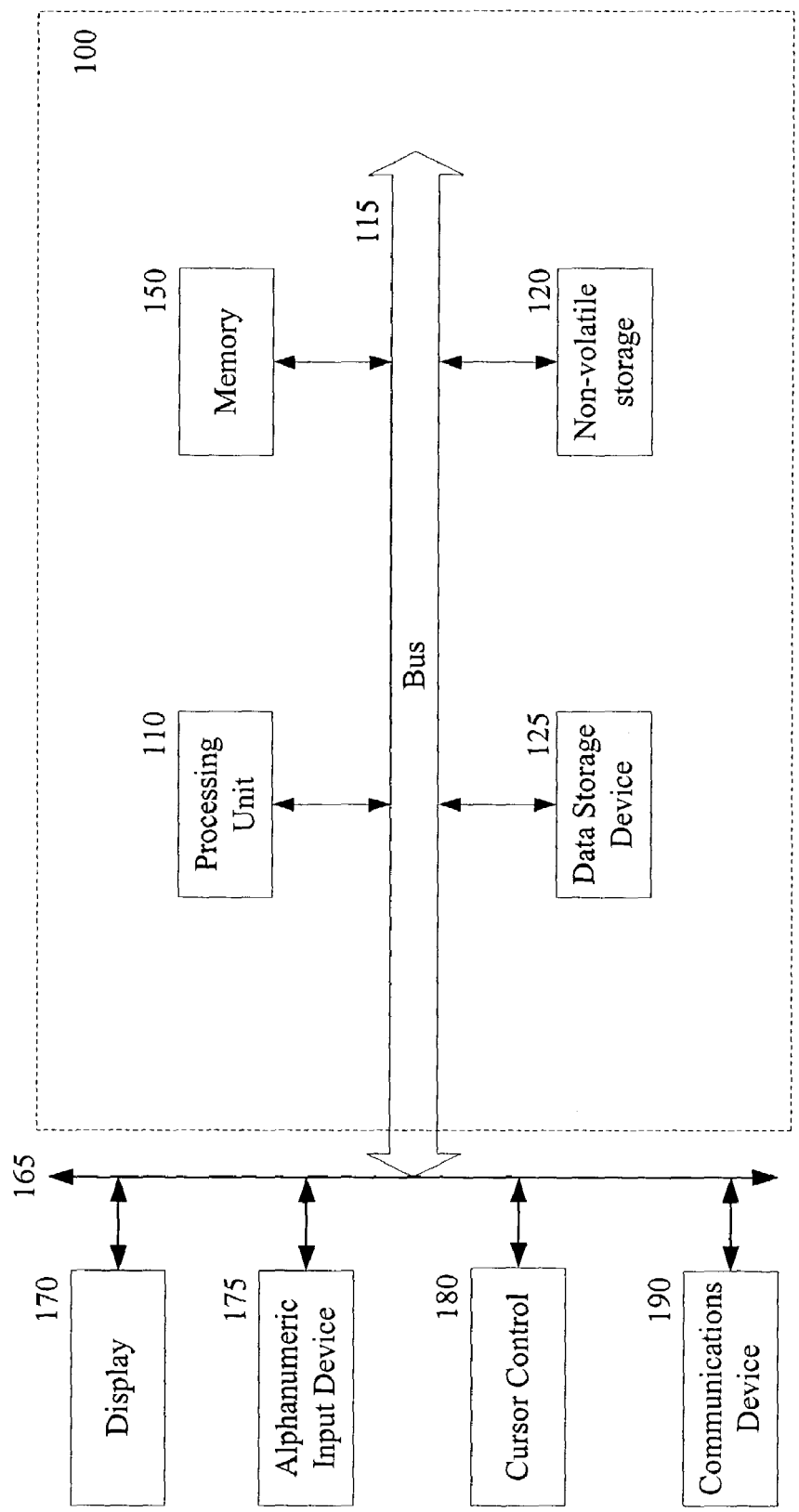
FIG. 1 is a block diagram of one embodiment of a computer system in which the present invention may be used.

FIG. 1 is one embodiment of a computer system that may be used with the present invention. It will be apparent to those of ordinary skill in the art, however that other alternative systems of various system architectures may also be used.

The data processing system illustrated in FIG. 1 includes a bus or other internal communication means 115 for communicating information, and a processor 110 coupled to the bus 115 for processing information. The system further comprises a random access memory (RAM) or other volatile storage device 150 (referred to as memory), coupled to bus 115 for storing information and instructions to be executed by processor 110. Main memory 150 also may be used for storing temporary variables or other intermediate information during execution of instructions by processor 110. The system also comprises a read only memory (ROM) and/or static storage device 120 coupled to bus 115 for storing static information and instructions for processor 110, and a data storage device 125 such as a magnetic disk or optical disk and its corresponding disk drive. Data storage device 125 is coupled to bus 115 for storing information and instructions.

The system may further be coupled to a display device 170, such as a cathode ray tube (CRT) or a liquid crystal display (LCD) coupled to bus 115 through bus 165 for displaying information to a computer user. An alphanumeric input device 175, including alphanumeric and other keys, may also be coupled to bus 115 through bus 165 for communicating information and command selections to processor 110. An additional user input device is cursor control device 180, such as a mouse, a trackball, stylus, or cursor direction keys coupled to bus 115 through bus 165 for communicating direction information and command selections to processor 110, and for controlling cursor movement on display device 170.

Another device, which may optionally be coupled to computer system 100, is a communication device 190 for accessing other nodes of a distributed system via a network. The communication device 190 may include any of a number of commercially available networking peripheral devices such as those used for coupling to an Ethernet, token ring, Internet, or wide area network. The communication device 190 may further be a null-modem connection, a wireless connection mechanism, or any other mechanism that provides connectivity between the computer system 100 and the outside world. Note that any or all of the components of this system illustrated in FIG. 1 and associated hardware may be used in various embodiments of the present invention.

It will be appreciated by those of ordinary skill in the art that any configuration of the system may be used for various purposes according to the particular implementation. The control logic or software implementing the present invention can be stored in main memory 150, mass storage device 125, or other storage medium locally or remotely accessible to processor 110.

It will be apparent to those of ordinary skill in the art that the system, method, and process described herein can be implemented as software stored in main memory 150 or read only memory 120 and executed by processor 110. This control logic or software may also be resident on an article of manufacture comprising a computer readable medium having computer readable program code embodied therein and being readable by the mass storage device 125 and for causing the processor 110 to operate in accordance with the methods and teachings herein.

The present invention may also be embodied in a handheld or portable device containing a subset of the computer hardware components described above. For example, the handheld device may be configured to contain only the bus 115, the processor 110, and memory 150 and/or 120. The present invention may also be embodied in a special purpose appliance including a subset of the computer hardware components described above. For example, the appliance may include a processor 110, a data storage device 125, a bus 115, and memory 150, and only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism.

It will be appreciated by those of ordinary skill in the art that any configuration of the system may be used for various purposes according to the particular implementation. The control logic or software implementing the present invention can be stored on any machine-readable medium locally or remotely accessible to processor 110. A machine-readable medium includes any mechanism for storing or transmitting information in a form readable by a machine (e.g. a computer). For example, a machine readable medium includes read-only memory (ROM), random access memory (RAM), magnetic disk storage media, optical storage media, flash memory devices, electrical, optical, acoustical or other forms of propagated signals (e.g. carrier waves, infrared signals, digital signals, etc.).

Figure 2A:
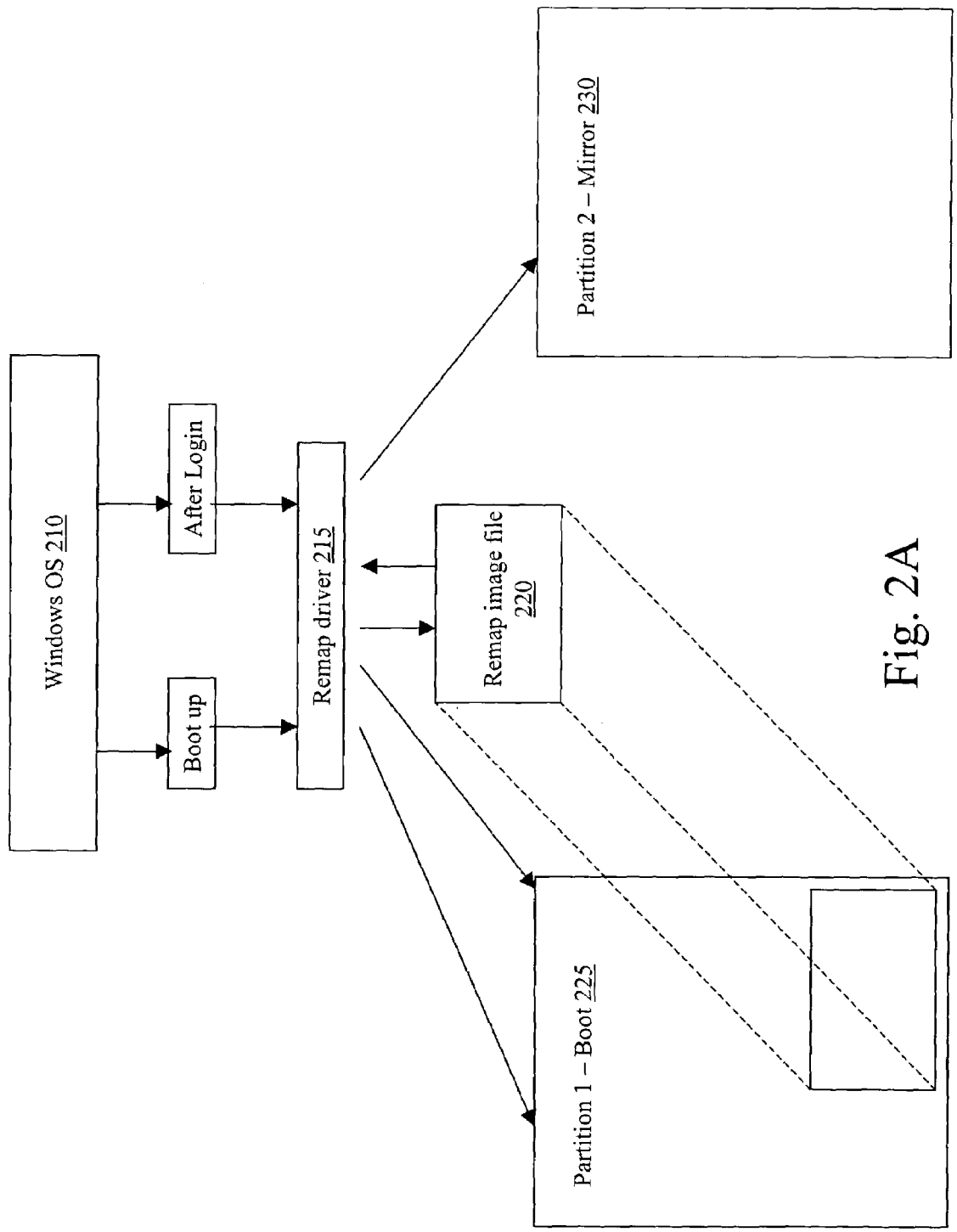
FIGS. 2A-C are block diagrams illustrating some embodiments of the partitions that may be defined.
Figure 2B:
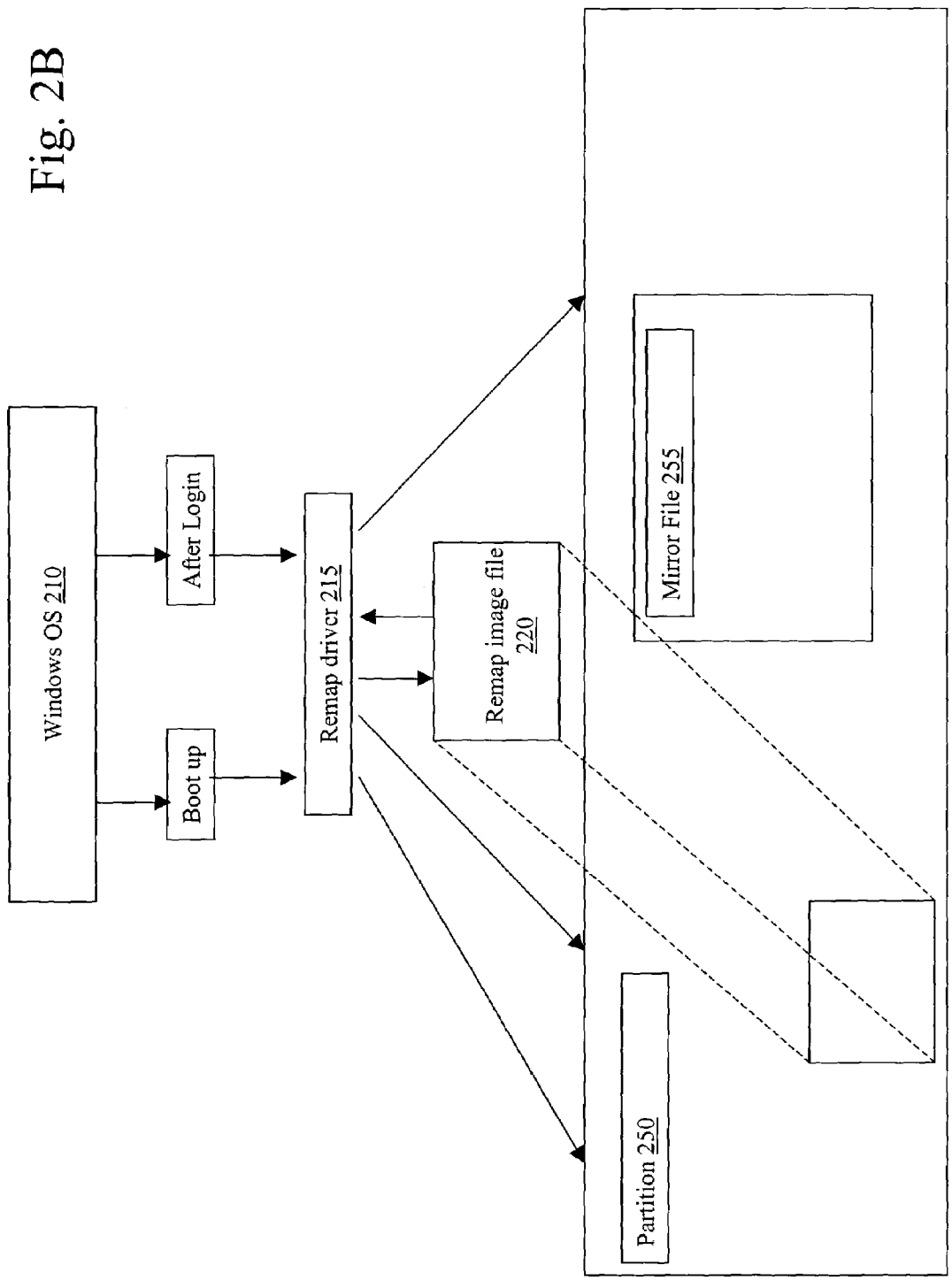
Figure 2C:
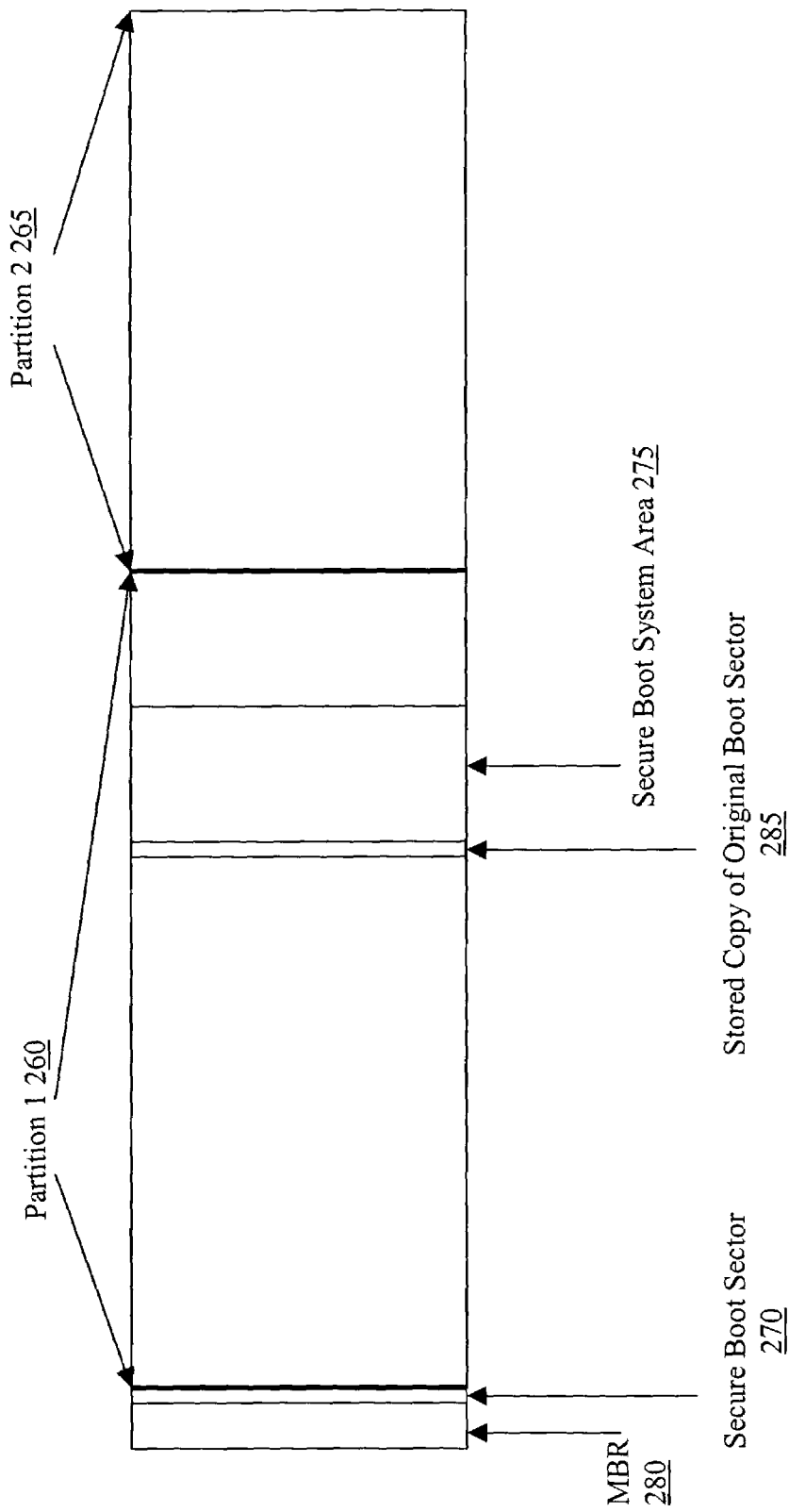

FIGS. 2A-C are block diagrams illustrating embodiments of the partitions that may be defined. FIG. 2A illustrates one embodiment of a system for secure booting. The system includes two identically sized partitions 225, 230. The first partition 225 is the boot partition. The boot partition 225 includes a remap image file 220, with one bit for each sector, indicating the state of that sector. For one embodiment, the flags may be:

0=sector contents should be retrieved from the original partition, and

1=sector contents should be retrieved from the second partition.

When a sector is written (and the contents changed), it is written to the second partition 230, and the corresponding bit in the bit map image file 220 is set to 1, thus forcing all further I/O requests for that sector to be redirected to the second partition 230. The main Windows operating system (O/S) 210 boots to partition 1 225 for boot up. Partition 1 225 is used for log-in and authentication. After log-in, the operating system 210 uses the remap driver 215, accessing the remap image file 220, to determine which partition 1 to access for any data element.

The remap 220 itself is written to a file in the first partition 225 using the same technique. This means that the remap 220 of the first partition will be filled with zeroes, and when the actual connection to the second partition is made, the remap 220 is marked 'invalid' and the bits for the remap itself is read from the second partition. Further I/O is performed to/from the disk using the instant remapping based on that remap 220.

FIG. 2B illustrates a second embodiment of a system for secure booting. The principle is quite similar to the remapping using two identical partitions, described above with respect to FIG. 2A. However, the remap 220 itself is allocated first in the file and contains a series of record numbers indicating the position in the file for the remapped sector. For one embodiment, the remap file is located on the disk that is being remapped. For another embodiment, the remap file is located on any other media accessible from that computer. For one embodiment, the remap 220 itself is allocated when the file is created, and it could be created with as many entries as sectors on the disk. In another embodiment, the remap 220 could be dynamic, containing only a list of the sectors that have changed. The remap table 220 contains records of offsets in the file for the corresponding sectors in the original volume.

After the user has logged in, the Remap driver 215 determines whether the requested sector is stored on the partition 250 or in the mirror file 255. Any data changed after login is stored only on the mirror file 255. The OS is only accessed from the partition 250. The data stored in the mirror file 255 are only changes that would be made to the original configuration at installation.

The remapping takes place when the user logs on into the OS, either locally or to a network. The remapped partition may be encrypted using another key. To understand the functionality, imagine 3 partitions: A, B, C where A is the original partition, B is a temporary partition used during startup, and C is an encrypted partition available only to this user. During the bootup, the system boots to partition B, and the remapping bit table is cleared. This enforces that the boot sequences are performed the same way, whether or not something has been changed or damaged during the previous boot attempts.

When the PC is booted and the user sees a login dialogue on the screen, the user will authenticate. This authentication may produce, by for example using a Smart Card or other identification device or key storage media, an encryption key for volume C where the user's private information resides. When access to C is granted, the remap driver 215 makes a remap from B (the temporary boot partition) 255 to C (the secure encrypted partition) thus giving the user access to his private information without the risk of having any malicious program entered from the start of the operating system.

For the one embodiment, the system creates a checksum of each sector in the drive. This checksum is placed in a file in the A drive. Since the checksum is encrypted, there is no chance for the user with no access to the encrypted partition to change any checksum if some of the files within the partition is changed (even that is difficult since the partition is fully encrypted and the attacker must pass other problems on the way.)

FIG. 2C illustrates a third embodiment of a system for secure booting. When the computer boots, it begins loading the secure boot code. For one embodiment, the MBR 280 is read to load the secure boot code. The secure system takes control of the Boot Sector 270 and boots a mini-OS contained in the System Area 275. For one embodiment, the secure system takes control of the MBR as well as the boot sector, and the secure MBR is loaded during the loading of the boot code. The mini-OS will start and authenticate the user. For one embodiment, self-tests will verify integrity of the mini-OS. Once the user has been authenticated, the encryption keys are unlocked. The mini-OS is shut down and the encryption keys are then loaded along with a driver to allow access to the encrypted partitions. The original boot sector is then loaded. This allows the original OS to boot, using the driver to access the disk. The mini-OS may be implemented in various ways. For one embodiment, the system may use Microsoft Windows Embedded (for example Microsoft Windows XP embedded), to create a customized "mini-OS." This OS would be completely compatible with the appropriate full version of Windows, run in a small environment and be able to perform the user authentication. In an alternative embodiment, various software programs may be used to emulate a Windows OS, whether in whole or in part. The elements that would be emulated include the network stack, the I/O subsystem (to talk with USB, serial, etc) and the authentication mechanism. These would be used to talk to the Windows drivers and enable them to work outside a "true" Microsoft OS. For one embodiment, the emulation would be created using Linux and WINE (Windows Emulator). In an alternative embodiment, for systems using a non-Windows primary operating system, the system may use a highly customized version of Linux (or another version of Unix). The customized version of Linux may use a RTL (Real-Time Linux) version. The mini-OS would have access to the same drivers, providing access to resources such as the network and local peripherals. This would allow the use of Linux drivers for advanced authentication services.

Figure 3:
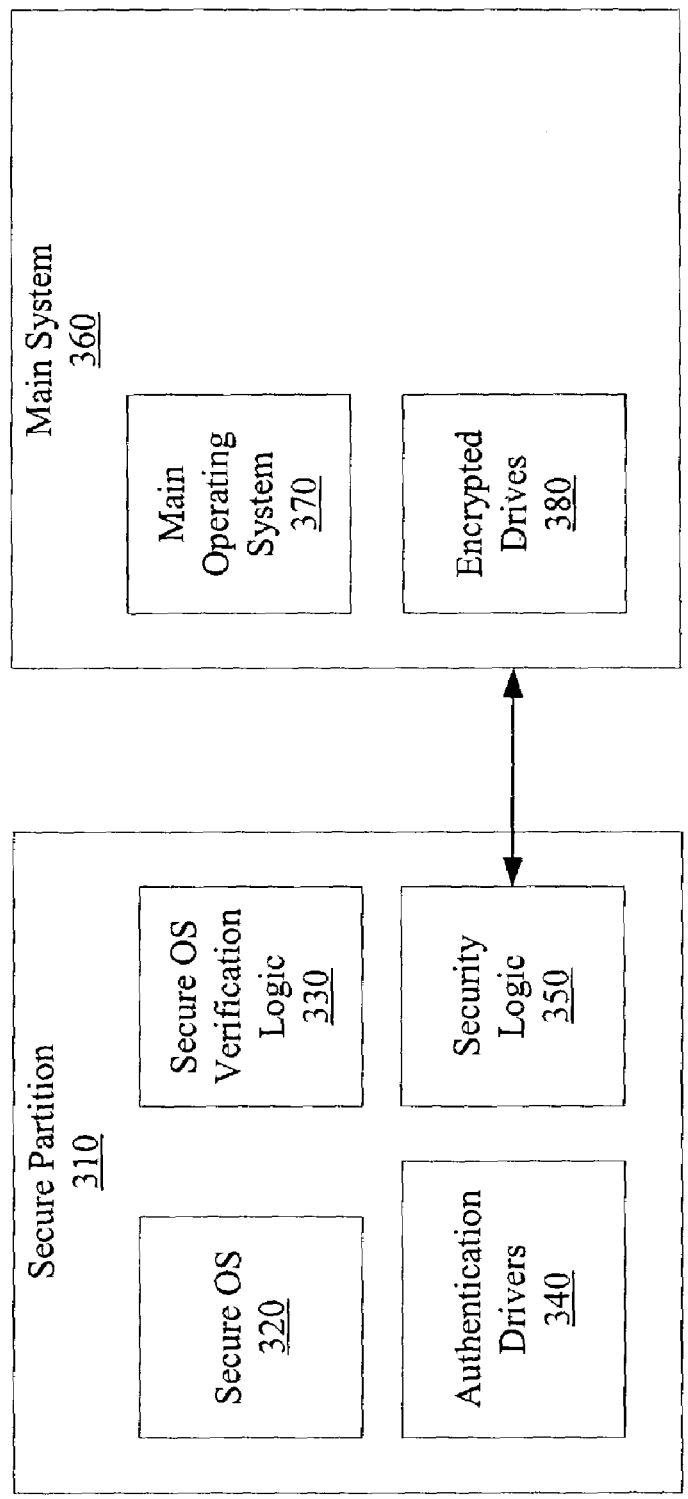
FIG. 3 is a block diagram of one embodiment of the secure booting application.

FIG. 3 is a block diagram of one embodiment of the secure booting application. The application includes a secure partition 310. The secure partition 310 includes a mini-OS 320. The mini-OS 320 is a secure operating system, whose integrity is verified by the verification logic 330. For one embodiment, on each boot-up the integrity of the mini-OS 320 is verified, to ensure that no modifications have been made to the mini-OS 320.

The secure partition 310 further includes authentication drivers 340. Authentication drivers 340 interact with the user, and enable the user to authenticate himself or herself, using the mini-OS 320. For one embodiment, the mini-OS 320 permits the use of standard drivers—thus authentication drivers 340 may be standard drivers useable on the main operating system 370. For one embodiment, the mini-OS 320 uses identical 32-bit authentication drivers as the main operating system 370.

The secure partition further includes security logic 350. Security logic 350, in response to successful authentication, generates the key to decrypt encrypted data on the main system 360. In one embodiment, security logic 350 may decrypt only those portions of the data that are currently being accessed, keeping most of the data encrypted on the main system 360.

The main system 360 is accessible only after authentication through the secure partition 310. The main system 360 may include multiple partitions, drives, and media. In one embodiment, any portions of the main system 360 which are currently not used remain encrypted for security purposes. In this way, security is provided through the use of a verified mini-OS for authentication.

Figure 4:
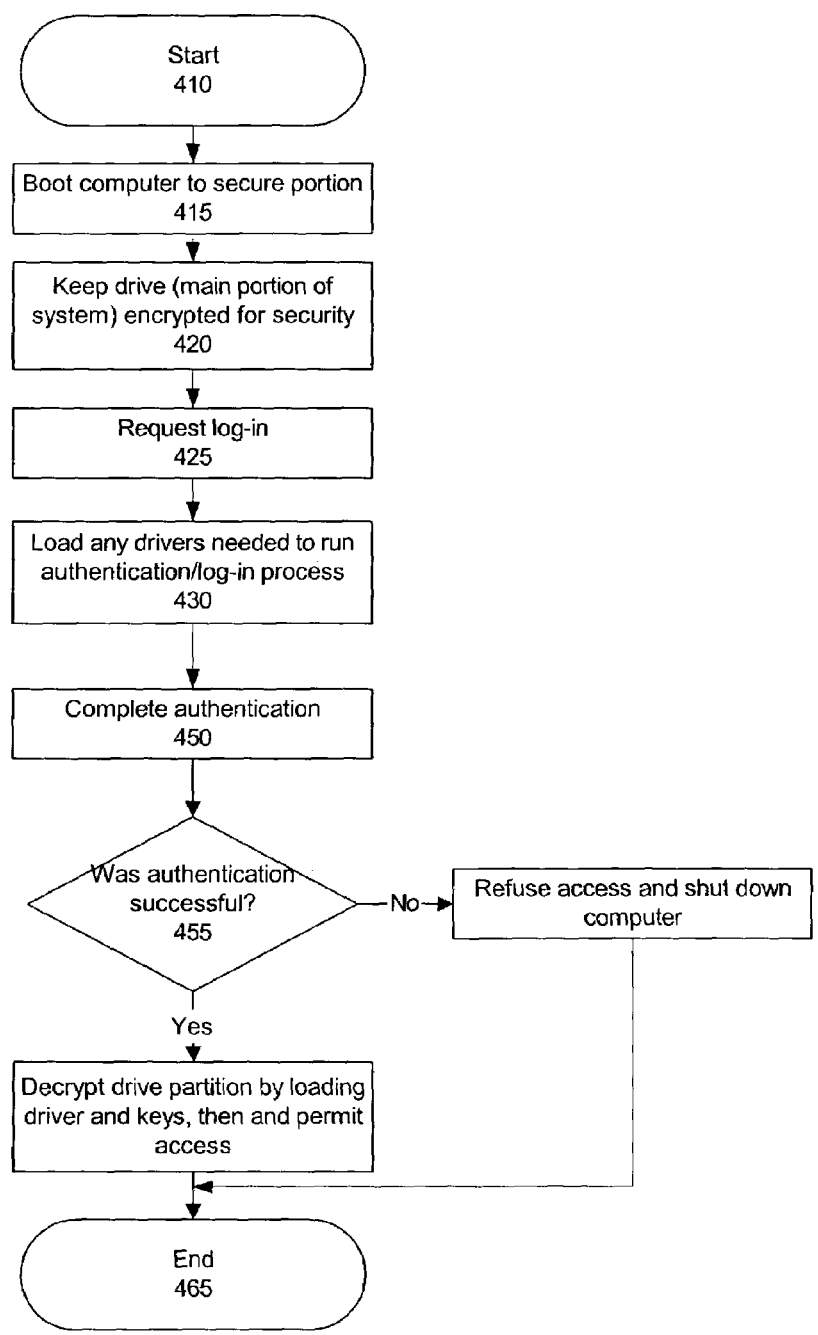
FIG. 4 is an overview flowchart of using the secure booting system.

FIG. 4 is an overview flowchart of using the secure booting system. The process starts at block 410, when a user attempts to bootup a computer system. At block 415, the computer is booted to the secure portion of the operating system. The secure portion of the operating system does not require the decryption of the drive itself. Thus, at block 420, the drive is kept encrypted for security. This encryption, for one embodiment, is constant; data is only decrypted as it is read into memory, leaving everything on the disk still encrypted. For another embodiment, the drive may be decrypted once a user is authenticated, and re-encrypted when that user logs out, or when the session expires.

At block 425, the log-in is requested from the user. For one embodiment, the log-in may require biometrics, a smart card, a password, or any other type of authentication mechanism that can be used.

At block 430, the appropriate drivers needed for the type of authentication being used are loaded. For example, smart card drivers may be required, if the user wishes to authenticate via a smart card. The use of native drivers for this process is beneficial, as noted above.

At block 450, the authentication is completed. At block 455, the process determines whether the authentication is successful. If not, at block 470, access is refused and the computer is shut down. Otherwise, at block 460, access is permitted. At this point, the system may decrypt the drive. The process then ends at block 465.

Figure 5A:
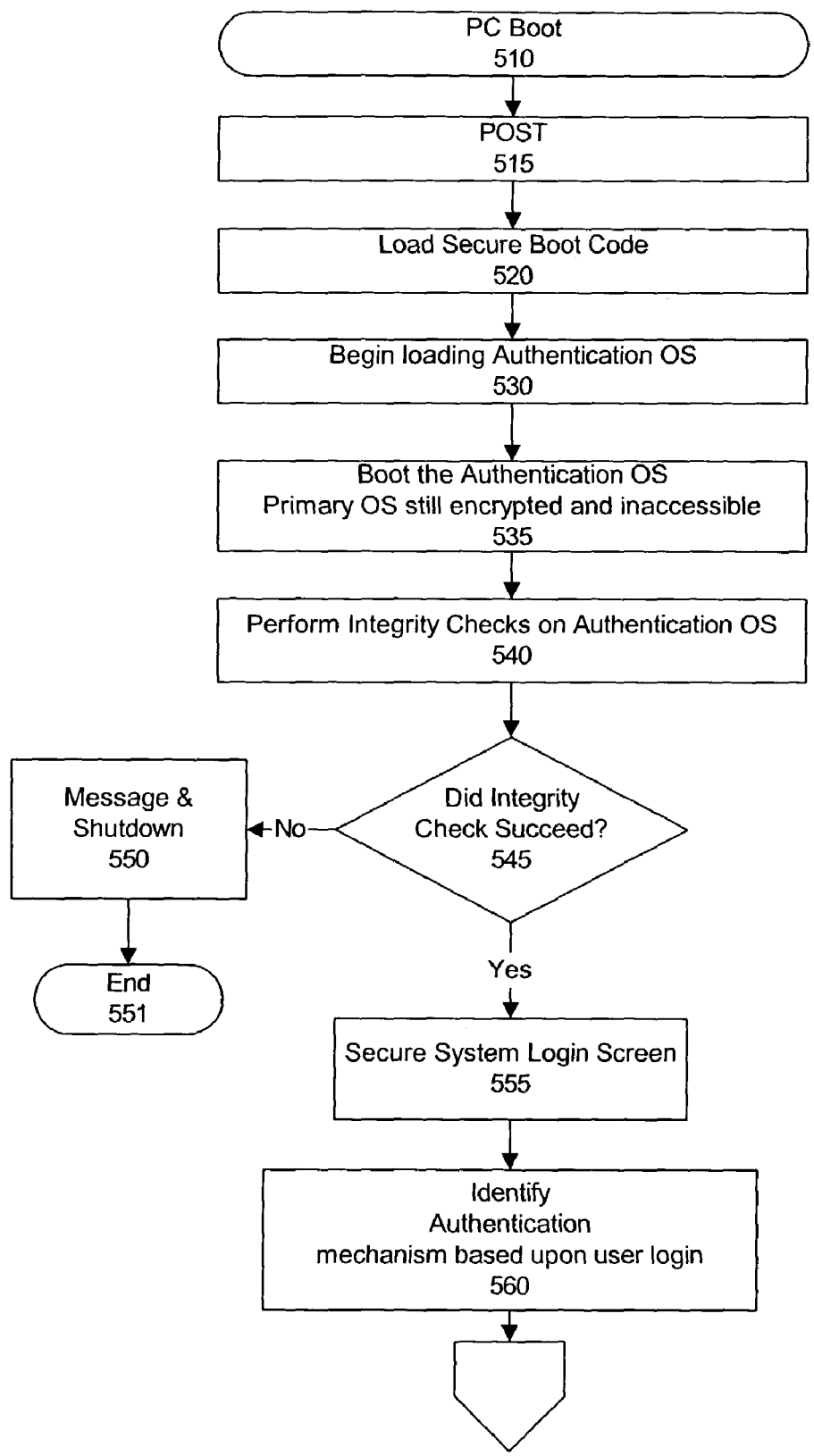
FIGS. 5A and 5B are flowchart of one embodiment of booting the computer system.
Figure 5B:
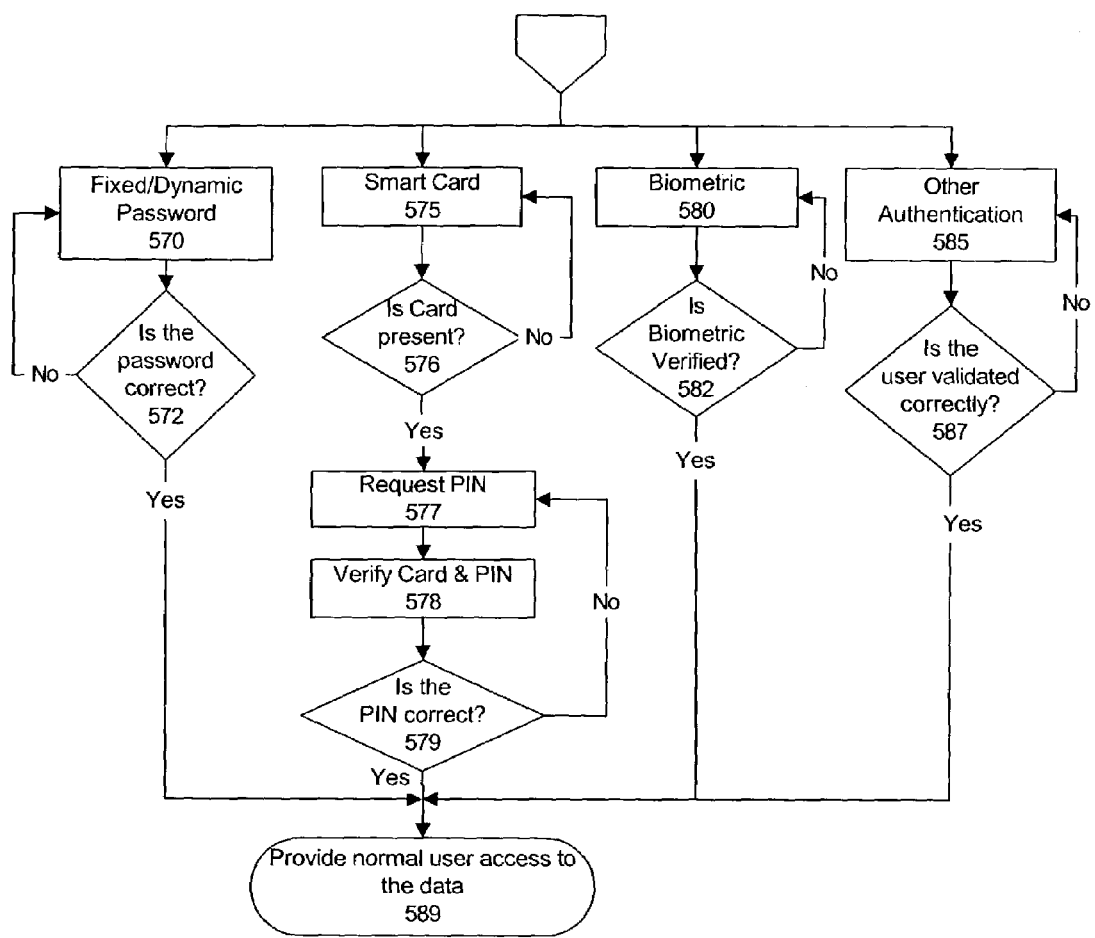

FIGS. 5A and 5B are flowchart of one embodiment of booting the computer system. At block 510, the computer system (PC) is booted up. At block 515, the POST command starts the booting process. Block 520 starts loading of the secure boot code. This permits the main drive to remain encrypted. This provides security, since a malicious person cannot access any of the data on the drive, even if he or she can short-circuit the log-on process.

At block 530, the authentication operating system (OS) is loaded, and at block 535, the authentication OS is booted. Note that the primary OS, or the main partition on which all data resides, remains encrypted and thus inaccessible.

At block 540, the system performs an integrity check on the authentication OS. For one embodiment, the system verifies that the authentication OS has not been altered since the last time someone successfully logged in. If the integrity check fails at block 545, a message is sent identifying the problem, and the computer is shut down at block 550. The process then ends at block 551. If the integrity check succeeds at block 545, the process continues to block 555.

At block 555, the secure system log-in screen is presented to the user. For one embodiment, this screen informs the user that he or she must log in to receive access to the primary system and data.

At block 560, the authentication mechanism for the user is identified. For one embodiment, the user log-in determines the authentication mechanism. For example, based on the user ID entered by the user, the system determines which type of authentication is associated with the particular user ID. For another embodiment, the same authentication mechanism is used for all users. The options listed, fixed/dynamic passwords, smart cards, biometrics, or other forms of authentication, are available to the user.

At block 570, the process determines that the authentication mechanism is a fixed or dynamic password. Thus, at block 572, the process determines whether the password entered by the user is correct. If not, the process returns to request the password again. For one embodiment, after a set number of iterations (e.g. false attempts), the process terminates, and notifies the user that he or she cannot connect to this computer. If the password is correct, the process continues to block 589.

Alternatively, at block 575, the authentication mechanism is a smart card. At block 576, the process determines whether a smart card is present. If not, the system, for one embodiment waits. As noted above, the system may time out. At block 577, the system requests a PIN number or appropriate activation information for the smart card. Most smart cards require a secret pin number, password, or similar authentication mechanism. At block 578, the pin number and card information are verified. If they are not correct, at block 579, the process returns to block 577, to request the PIN again. For one embodiment, after a set number of attempts (which may be as low as one), the process may disable access for a period of time, to minimize the likelihood of a hacker using the system. If the smart card and pin combination is successfully verified, the process continues to bock 589.

Alternatively, at block 580, a biometric authentication mechanism may be used. The biometric may be a fingerprint, an iris scan, a palm print, a voice print, or any other biometric identification type. At block 582, the system attempts to verify the biometric. The biometric, for one embodiment, is compared against a registration biometric associated with the user. If the biometric is successfully verified, the process continues to block 589. Otherwise, the process requests the biometric again, or if a number of attempts have been received, the process terminates.

In yet another alternative, another type of authentication mechanism may be used. The authentication mechanism may be something that currently exists (such as secret knowledge, implanted ID chip, etc.) or something that is later invented. For one embodiment, any authentication mechanism that has a driver that can be run within the secure operating system can be used. At block 587, the process determines whether the user has been successfully validated. If so, the process continues to block 589. Otherwise, as described above, the process may retry or terminate, depending on the preset preferences.

Figure 6A:
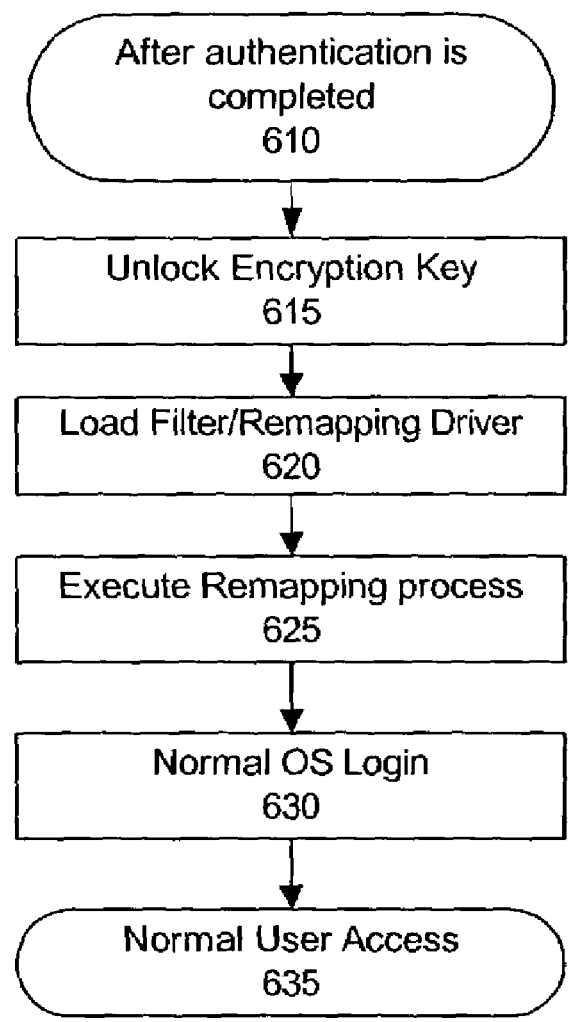
FIGS. 6A and 6B are two alternatives of providing access to the computer system, after authentication.
Figure 6B:
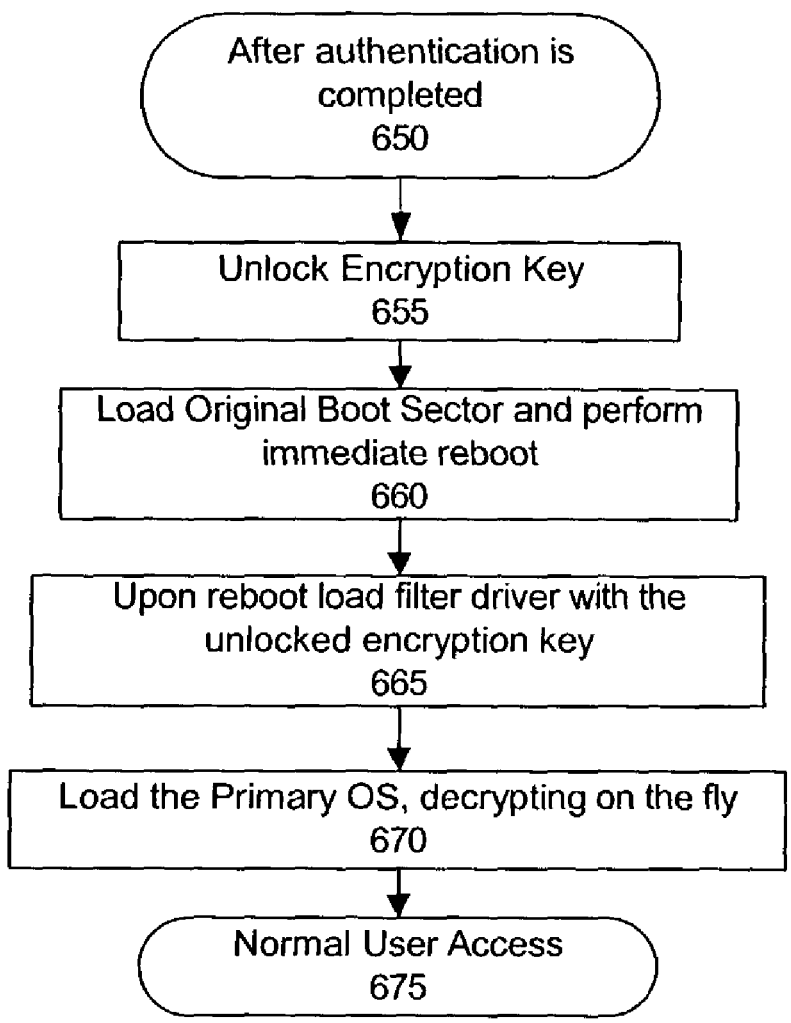

At block 589, after successful validation, normal user access is provided. Note that many of the above authentication methods require local drivers. For example, smart cards require a driver that recognizes the smart card (such as a PCMCIA card). Similarly, biometric sensors require a driver for the particular sensor. Furthermore, the authentication and encryption mechanisms used may also require drivers. The present system, as noted above, permits the use of native drivers. Thus, the secure OS uses the same drivers as used in the primary OS. FIGS. 6A and 6B illustrate two alternative methods of providing normal user access, which corresponds to block 589 of FIG. 5B.

Figure 7:
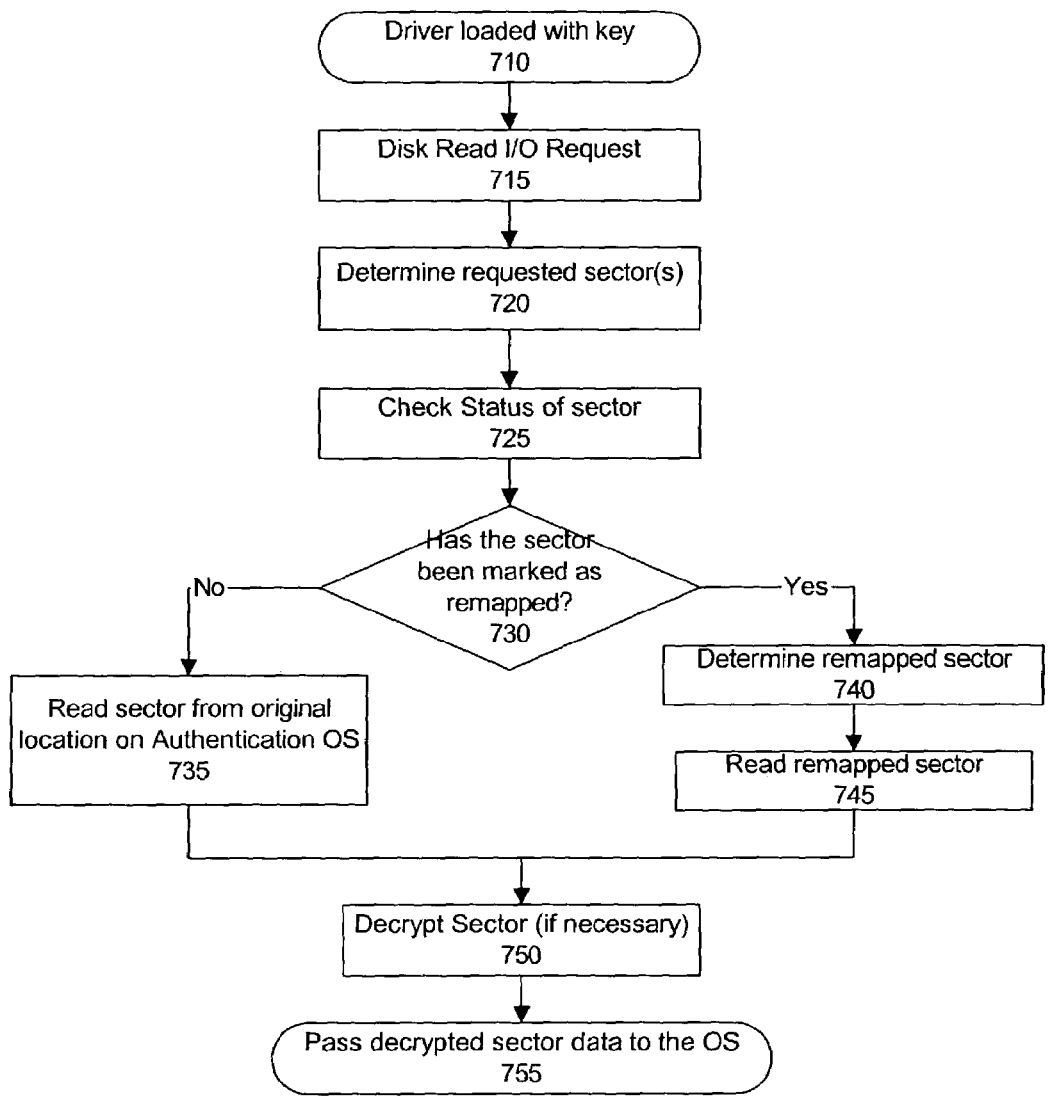
FIG. 7 is a flowchart of one embodiment of performing a read request on the system of FIGS. 5A and 5B.

FIG. 7 is a flowchart of one embodiment of performing a read request. At block 710, the driver is loaded with the key. The key, which is unlocked upon authentication, permits access.

At block 715, a disk read or I/O request is received. The system, at block 720, determines the requested sector(s). The requested sectors indicate the location of the stored data being requested. At block 725, the process tests the status of the sector. The status is either "remapped" or "unmapped." This status can be found in the remap file. Remapped sectors can be found in the mirror file, while unmapped sectors are loaded from the original location. For one embodiment, for any remapped sector, the sector is marked remapped if the version in the mirror file is not identical to the version at the original location.

If the sector has been marked as unmapped (at block 730), the process continues to block 735, and the sector is read from the original location on the authentication OS. If the sector is marked as remapped, the process continues to block 740. At block 740, the remapped sector is identified, and at block 745, the remapped sector is read. Thus, if the sector is marked as remapped and unchanged, the data is retrieved from the remapped sector.

At block 750, the sector is decrypted, if necessary. The data, if retrieved from the mapped sector on the securely encrypted disk, may be encrypted. In that instance, the key is used to decrypt the data. At block 755, the decrypted sector data is passed to the requester.

Figure 8:
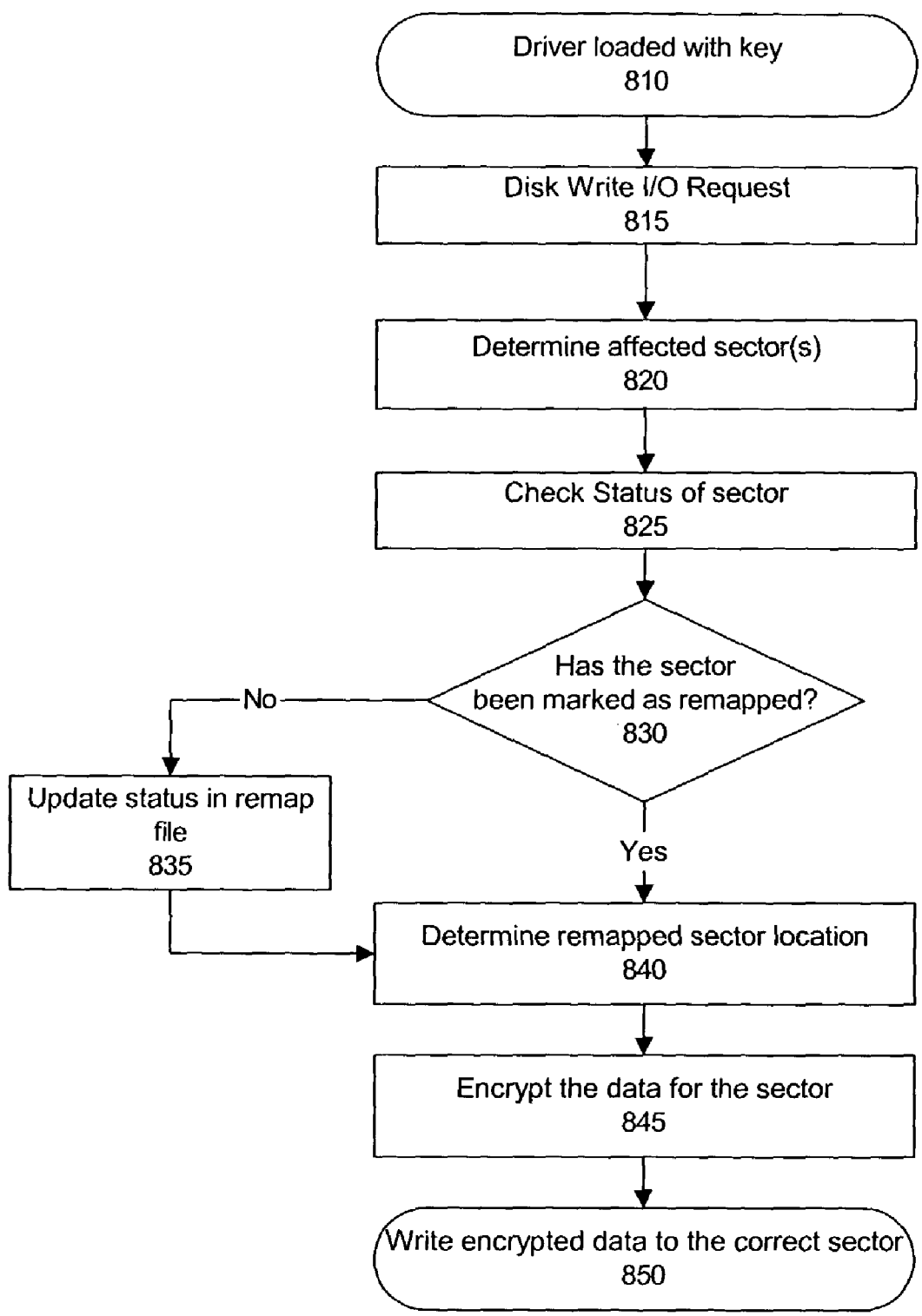
FIG. 8 is a flowchart of one embodiment of performing a write request on the system of FIGS. 5A and 5B.

FIG. 8 is a flowchart of one embodiment of performing a write request on the system. The process starts at block 810, when the driver is loaded with the appropriate key. At block 815, a disk write I/O request is received. At block 820, the affected sector(s) are identified, and their status is checked at block 825. As noted above, when a sector is changed, this is indicated in the remap file. If the sector is already marked as changed, the process continues to block 840. Otherwise, at block 835, the status of the sector(s) in the remap file is updated, to reflect that the sector has been changed.

At block 840, the mapped sector location is identified. The data sent with the write request is then encrypted, at block 845, using the encryption key, the encrypted data is then written to the correct sector in the mapped sector. Thus, when the same sector is being subsequently read, the remap indicates that the sector has been changed, and therefore the data is retrieved from the mapped, encrypted partition, rather than from the authentication OS partition.

Thus, the system described in FIGS. 5-7 illustrate one embodiment of the system. The system creates a partition on which the authentication operating system (OS) is located. This partition includes a mirror of the data. This corresponds, for example, to FIG. 2A, described above.

Figure 9:
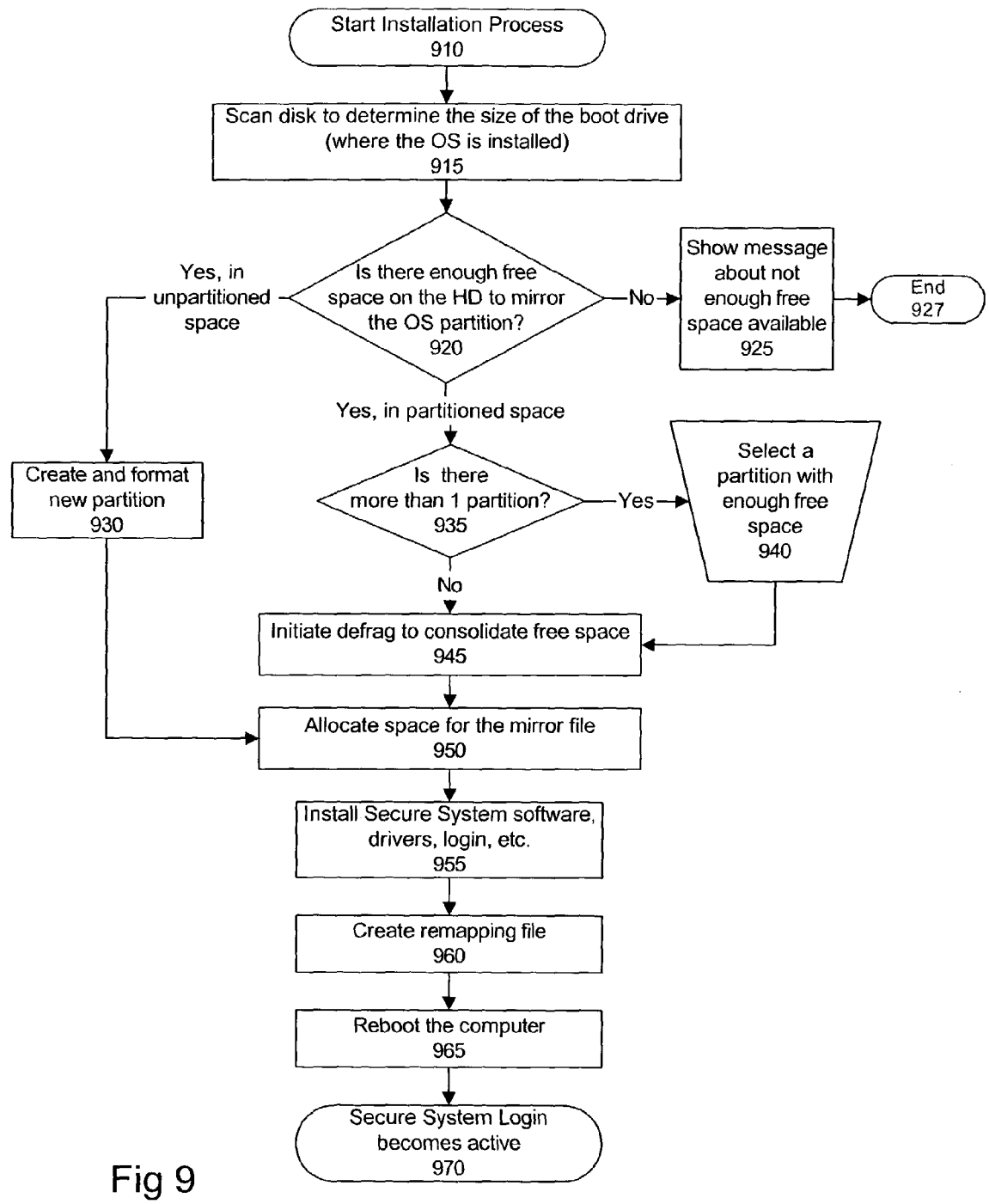
FIG. 9 is a flowchart of one embodiment of installing the secure boot system.

FIG. 9 is a flowchart of one embodiment of installing the secure boot system. At block 910, the installation process is started. For one embodiment, the present system may be installed from one or more floppy disks, compact discs, via a download from a network such as the Internet, or through any other means.

At block 915, the disk is scanned to determine the size of the boot drive. The boot drive is the drive on which the primary operating system is installed. In some computer systems, there are multiple drives. However, only one drive is designated as the "boot drive" to which the system first goes upon booting.

At block 920, the process determines whether there is sufficient space on the boot drive to create a mirror of the OS partition. If there is not, at block 925, the user is notified, and the process terminates at block 927. For one embodiment, the user may be given the option to remove files from the boot drive, or compress files. If the user does so, and thereby creates enough space, the process may return to block 920, and continue the appropriate route.

If there is enough space on the boot drive, the process determines whether the space is in partitioned space or unpartitioned space. Partitioned space is space that has been broken up into blocks that are separately addressed. The creation of such partitions is well known in the art.

If the free space is in partitioned space, the process continues to block 935. The process, at block 935, determines whether there is more than one partition. If there is more than one partition, at block 940, a partition with sufficient free space is selected for the remainder of this process, and the process continues to block 945. If there is only a single partition, the process continues directly to block 945.

At block 945, a defragmentation utility is run to consolidate the space. The process of defragmentation is well known in the art. The process then continues to block 950.

If, at block 920, the system determined that there was enough unpartitioned space to create the mirror, then the process continues to block 930. At block 930, a partition is created and formatted for the mirror file. The process then continues to block 950. At block 950, space is allocated for the mirror file.

At block 955, the secure system software and drivers are installed on the original partition. For one embodiment, the drivers are identical to the main drivers used in the original OS. The drivers provide support for the authentication mechanisms available on the system, as described above.

At block 960, the remapping is created. The remapping permits access to the original system, through the secure system, as described above with respect to FIG. 5. The creation of a remap file is known in the art.

At block 965, the computer is rebooted. The system activates the secure system log-in.

FIG. 6A is a flowchart of one embodiment of providing user access, after authentication. At block 615, the encryption key is unlocked. Note that this occurs after successful authentication, as discussed above with respect to FIGS. 5A-B. At block 620, the filter/remap driver is loaded. As discussed above with respect to FIGS. 2A and 2B, in one embodiment, the remapping enables access to the encrypted data through the remap driver and remap image file.

At block 625, the remapping process is executed to create the remap image of the secured data. This enables the remap driver to access the data on the secure partition of the drive, as will be discussed below with respect to FIGS. 7 & 8.

At block 630, the system logs into the normal operating system (the main system.) For one embodiment, the user may be asked for another validation. Alternatively, this step may be performed automatically, since the user has already been authenticated by the secure OS. At block 635, normal user access is permitted. Normal user access enables the user to access all data on the secure partition. However, as noted above, for one embodiment, the access to the secure partition continues to be through the remap driver.

FIG. 6B is a flowchart of an alternative embodiment of providing user access, after authentication. At block 655, the encryption key is unlocked. At block 660, the original boot sector is loaded, and an immediate reboot is performed. At block 665, the filter driver is loaded using the unlocked encryption key. Note that the authentication process described above cannot be skipped, since the encryption key is needed to be able to use the driver in the original boot sector. At block 670, the primary operating system is loaded, and decrypted on the fly. As discussed above, with respect to FIG. 2C, the authentication operating system may be substantially different from the installed OS.

Figure 10A:
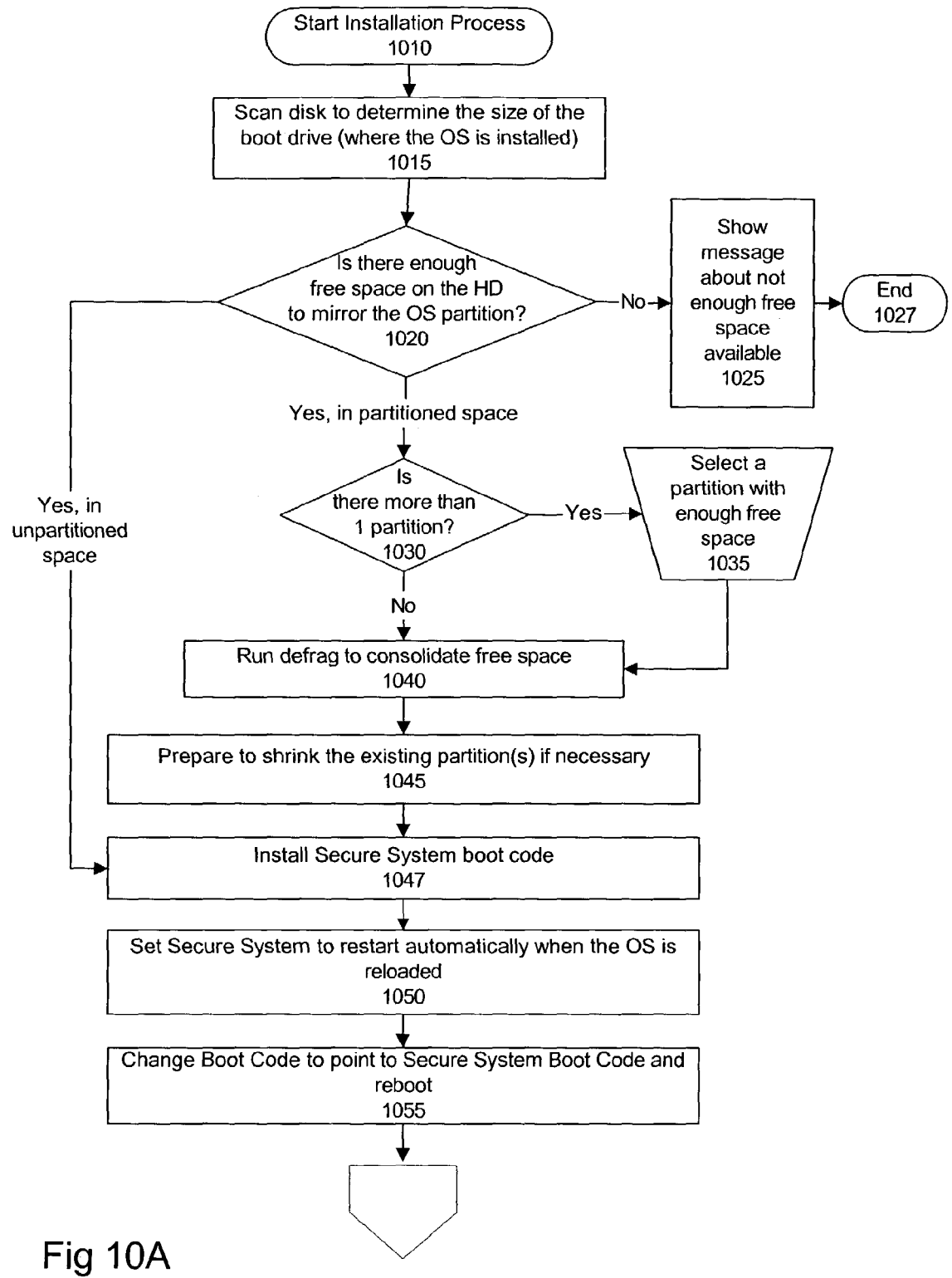
FIGS. 10A and 10B are flowchart of another embodiment of installing the secure boot system.
Figure 10B:
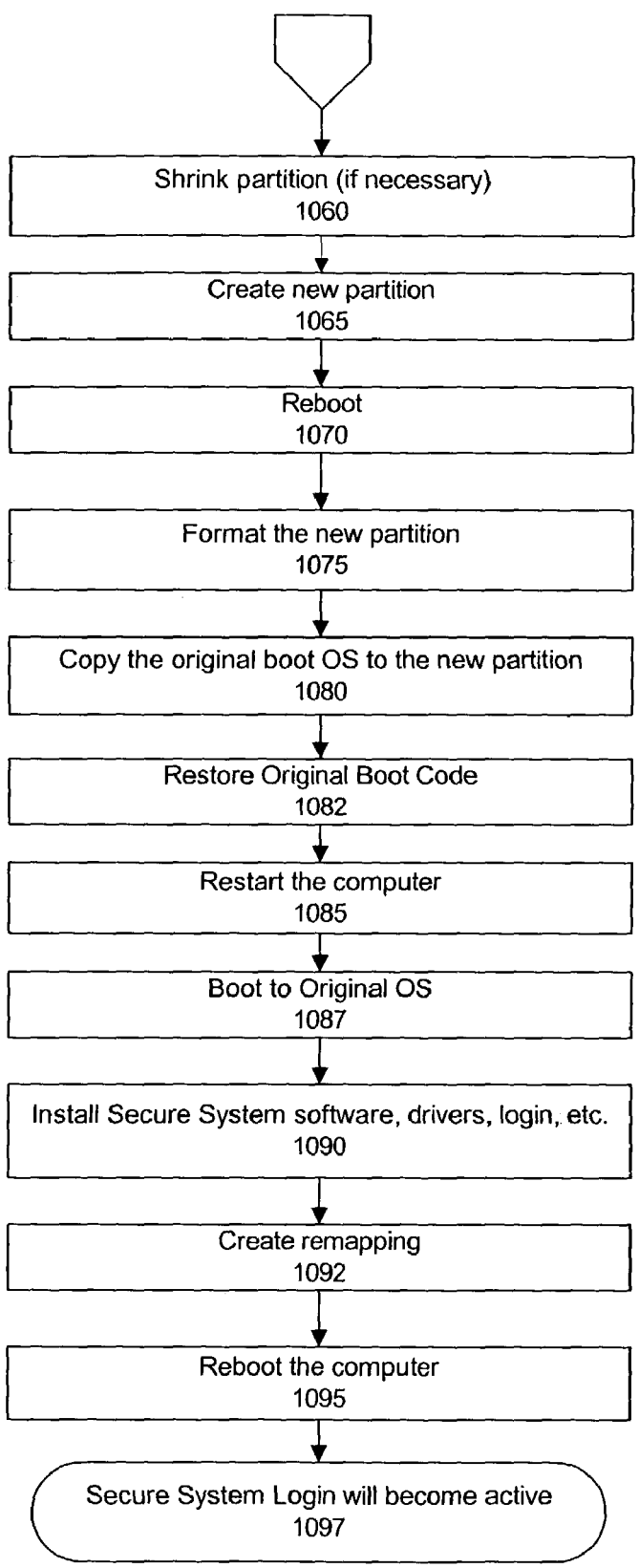

FIGS. 10A and 10B are flowchart of one embodiment of installing the secure boot system of FIGS. 5A and 5B. At block 1010, the installation process is started. For one embodiment, the present system may be installed from one or more floppy disks, compact discs, via a download from a network such as the Internet, or through any other means.

At block 1015, the disk is scanned to determine the size of the boot drive. The boot drive is the drive on which the primary operating system is installed. In some computer systems, there are multiple drives. However, only one drive is designated as the "boot drive" to which the system first goes upon booting.

At block 1020, the process determines whether there is sufficient space on the boot drive to create a mirror of the OS partition. If there is not, at block 1025, the user is notified, and the process terminates at block 1027. For one embodiment, the user may be given the option to remove files from the boot drive, or compress files. If the user does so, and thereby creates enough space, the process may return to block 1020, and continue the appropriate route.

If there is enough space on the boot drive, the process determines whether the space is in partitioned space or unpartitioned space.

If the free space is in partitioned space, the process continues to block 1030. If the data is in fragmented the process, at block 1030, determines whether there is more than one partition. If there is more than one partition, at block 1035, a partition with sufficient free space is selected for the remainder of this process, and the process continues to block 1040. If there is only a single partition, the process continues directly to block 1040.

At block 1040, a defragmentation utility is run to consolidate the space. The process of defragmentation is well known in the art.

At block 1045, the existing partitions are prepared to be shrunk. For one embodiment, if there are multiple partitions, in addition to defragmenting one partition, one or more of the other partitions may be prepared to be reduced in size or moved to create sufficient contiguous free space on the disk. For one embodiment, if the selected partition, once defragmented, has enough space, this step may be skipped.

At block 1047, a new partition is created, and the secure system boot code is installed on the new partition. If, at block 1020, the system determined that there was enough non-fragmented space in unpartitioned space, then the process continued directly to block 1047. At block 1050, the system is set to restart (reboot) automatically when the operating system is reloaded.

At block 1055 the secure boot code is installed. This ensures that when the computer system is booted next, it will boot to the secure system, not the main operating system. The system is then rebooted. The reboot starts the system in the secure system.

At block 1060, the partitions that were prepared at block 1045 are shrunk, if necessary, and at bock 1065, a new partition is created.

At block 1070, the system is rebooted again. At this point, there is a new, clean partition that may be used by the system. At block 1075, the new partition is formatted. At block 1080, the original boot OS is copied to the new partition and the original boot sector is restored, at block 1082. At this point, the computer system boots to the old partition, at block 1087.

At block 1090, the secure system software and drivers are installed. For one embodiment, the drivers are identical to the main drivers used in the original OS. The drivers provide support for the authentication mechanisms available on the system, as described above.

At block 1092, the remapping is created. The remapping permits access to the original system, through the secure system, as described above with respect to FIG. 5. The creation of a remap is known in the art.

At block 1095, the computer is rebooted one final time. The system activates the secure system log-in. Thus, the authentication system described above with respect to FIG. 5 is subsequently used.

Figure 11:
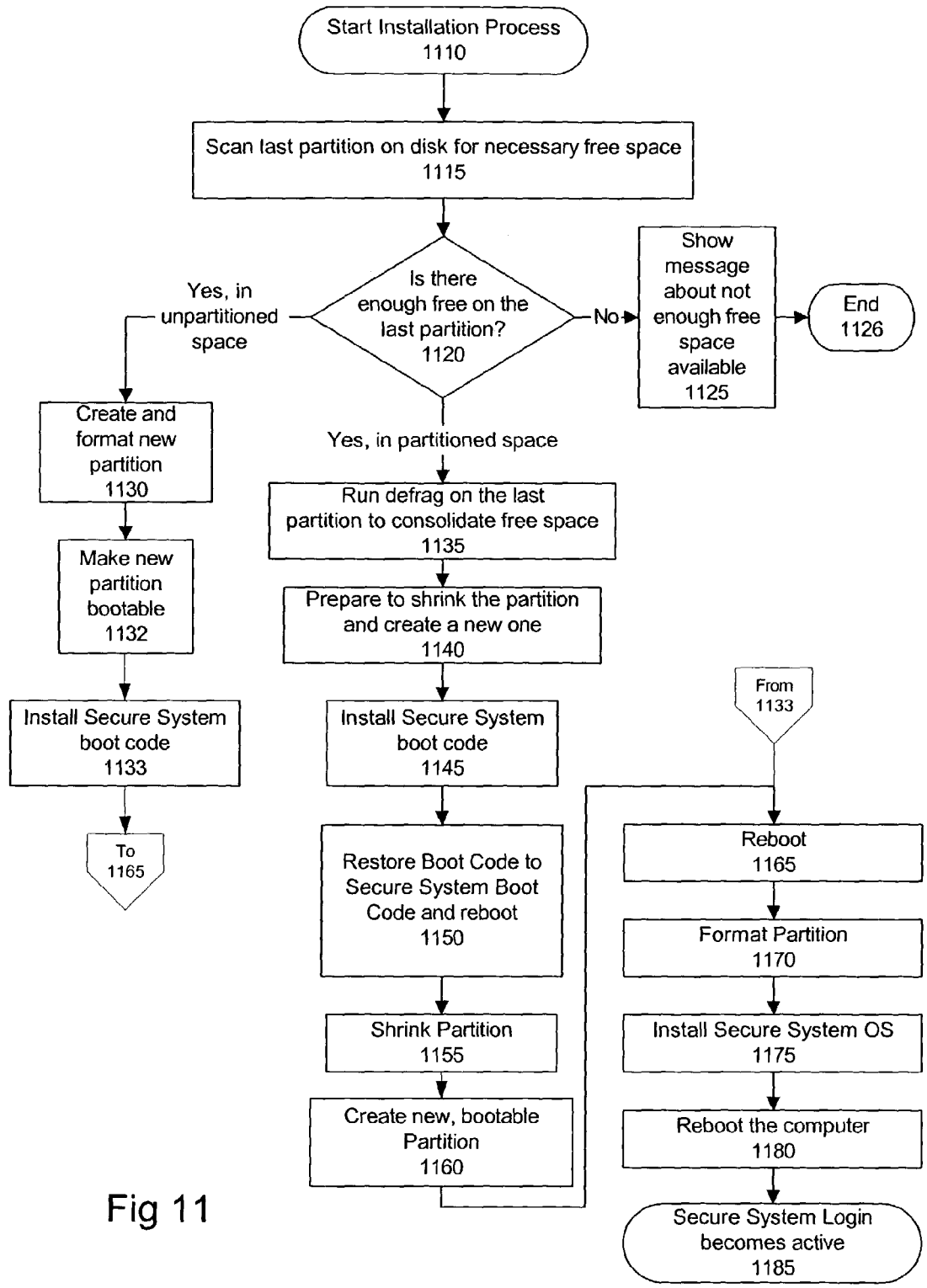
FIG. 11 is a flowchart of another embodiment of installing the secure boot system.

FIG. 11 is a flowchart of another embodiment of installing the secure boot system. The installation process starts at block 1110. At block 1115, the last partition on the disk is scanned for the necessary free space to install the bootable secure system partition. Note that unlike the examples described in FIGS. 9 and 10, this embodiment attempts to place the new partition as the last partition. If there is not sufficient space, as determined at block 1120, the process shows a message at block 1125, and terminates at block 1126. For one embodiment, as described above, the user may be permitted to move files around, to create enough space for the installation. If there is enough space, the process determines whether the space is in partitioned space or unpartitioned space.

If the space is in unpartitioned space, the process continues to block 1130. At block 1130, a new partition is created and formatted. At block 1132, the new partition is made bootable. At block 1133, the secure system boot code is installed. This enables the system to boot to the secure system log-in. The process then continues to block 1165.

If the space is in partitioned space, the process continues to block 1135. At block 1135, the last partition is defragmented to consolidate space. At block 1140, the system prepares to shrink the last partition, and create a new, bootable partition. The process then continues to block 1145.

At block 1145, the secure system boot code is installed. This enables the system to boot to the secure system log-in. This is the log-in described above with respect to FIGS. 5A-B.

At block 1150, the secure system boot code is restored, and the system is rebooted. For one embodiment, this is done by changing the master boot record (MBR) to point to the newly created bootable partition.

At block 1155, the last partition is shrunk, and a new bootable partition is created, at block 1160.

The computer is then rebooted at block 1165. At block 1170, the new, bootable partition is formatted. The secure system operating system is installed, at block 1175. As noted above, this operating system may be different from the "main operating system." For example, the secure system OS may be an embedded version of Windows, a Windows emulator running on another operating system such as Linux, or another OS.

At block 1180, the computer is once again rebooted. At this point, the secure system log-in is active, and the system boots to the secure system OS, as described above. Thus, the user can now log into the system, as described above with respect to FIGS. 5A-B.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of securely booting a computer system comprising, upon initial booting:
   loading secure boot code;
   loading a secure operating system for authentication, the secure operating system using drivers for security technologies from a main operating system;
   authenticating a user in the secure operating system, prior to permitting access to the main operating system;
   after authentication is completed, releasing an encryption key; and
   rebooting the computer system and using the encryption key to decrypt the main operating system.

2. The method of claim 1, further comprising:
   performing an integrity check on the secure operating system, and proceeding when the integrity check succeeds.

3. The method of claim 1, further comprising:
   selecting an authentication mechanism based upon user login into the secure operating system; and
   authenticating the user using the authentication mechanism.

4. The method of claim 3, wherein the authentication mechanism requires a driver, and wherein the driver is run in the secure operating system.

5. The method of claim 4, wherein a standard driver may be used within the secure operating system.

6. The method of claim 1, further comprising:
   after authentication is completed, remapping the main operating system and data through the secure operating system; and
   providing access to the main operating system through the secure operating system.

7. The method of claim 1, wherein the main operating system partition is decrypted on the fly.

8. A method of using a secure boot operating system, comprising:
   upon boot, loading the secure 32-bit boot operating system while leaving a primary operating system encrypted and inaccessible;
   providing a secure system login, using an authentication mechanism, the authentication mechanism including a driver;
   interacting with the authentication mechanism to authenticate the user; and
   if the user is successfully authenticated, unlocking an encryption key and permitting normal user access to the primary operating system.

9. The method of claim 8, further comprising, prior to providing a login, performing an integrity check on the secure boot operating system; and if the integrity check fails, preventing login to the system.

10. The method of claim 8, wherein the authentication mechanism is any authentication mechanism supported by a 32-bit driver in the secure boot operating system.

11. The method of claim 10, wherein the 32-bit authentication driver in the secure boot operating system is identical to the authentication drivers used in the main operating system.

12. The method of claim 8, wherein the authentication mechanism comprises one or more of the following: a fixed password, a dynamic password, a smart card, and a biometric.

13. The method of claim 8, further comprising:
loading the original boot sector, and performing a reboot of the computer system; and
loading the filter driver with the unlocked encryption key, to permit access to the primary operating system.

14. The method of claim 13, wherein the primary operating system is decrypted on the fly.

15. The method of claim 8, further comprising:
loading a filter and remapping driver;
executing a remapping process; and
logging into the primary operating system.

16. The method of claim 8, wherein the driver used for the authentication mechanism is a full-featured driver which is usable on the primary operating system.

17. The method of claim 8, wherein the secure boot operating system is a limited functionality operating system, and the secure boot operating system uses full-featured drivers designed for the primary operating system.

18. The method of claim 8, wherein the secure boot operating system is located in a separate partition.

19. A method of securely booting a computer system comprising, upon initial booting:
loading secure boot code;
loading a secure operating system for authentication, the secure operating system using drivers for security technologies from a main operating system;
authenticating a user in the secure operating system, prior to permitting access to the main operating system;
after authentication is completed, remapping the main operating system and data through the secure operating system; and
providing access to the main operating system through the secure operating system.

20. The method of claim 19, further comprising:
performing an integrity check on the secure operating system, and proceeding when the integrity check succeeds.

21. A system to securely boot a computer system comprising:
secure boot code to enable initial booting;
a secure operating system to be loaded initially to provide authentication;
an authentication driver working with the secure operating system to enable authentication of a user in the secure operating system, prior to permitting access to a main operating system;
a security logic to enable access to the main operating system after successful authentication.

22. The system of claim 21, further comprising:
a secure operating system authentication logic to perform an integrity check on the secure operating system prior to permitting the secure operating system to be used for authentication.

* * * * *